United States Patent
Fiorentino et al.

(10) Patent No.: US 12,434,962 B2
(45) Date of Patent: Oct. 7, 2025

(54) METHOD FOR FABRICATING A MICROFLUIDIC DEVICE

(71) Applicant: IMEC VZW, Leuven (BE)

(72) Inventors: Giuseppe Fiorentino, Etterbeek (BE); Aurelie Humbert, Schaarbeek (BE); Simone Severi, Leuven (BE); Benjamin Jones, Kessel-Lo (BE)

(73) Assignee: IMEC VZW, Leuven (BE)

( * ) Notice: Subject to any disclaimer, the term of this patent is extended or adjusted under 35 U.S.C. 154(b) by 518 days.

(21) Appl. No.: 17/203,026

(22) Filed: Mar. 16, 2021

(65) Prior Publication Data

US 2021/0300752 A1    Sep. 30, 2021

(30) Foreign Application Priority Data

Mar. 24, 2020  (EP) .................................... 20165314

(51) Int. Cl.
*B81C 1/00* (2006.01)
(52) U.S. Cl.
CPC ...... *B81C 1/00071* (2013.01); *B81C 1/00031* (2013.01); *B81C 1/00206* (2013.01);
(Continued)

(58) Field of Classification Search
CPC ............ B81C 1/00071; B81C 1/00031; B81C 1/00206; B81C 2201/0132; B81C 2201/0159; B81C 2201/0169; B81C 2201/0183; B81C 2201/0198; B81C 1/0015
See application file for complete search history.

(56) References Cited

U.S. PATENT DOCUMENTS 4,192,059 A * 3/1980 Khan ..................... H10B 20/00
257/E21.507
4,671,846 A * 6/1987 Shimbo ................. G01L 19/147
438/455
(Continued)

FOREIGN PATENT DOCUMENTS

WO    2009149362 A2    12/2009
WO    2009149362 A3    12/2009
WO    2009149362 A9    12/2009

OTHER PUBLICATIONS

Williams et al. "Wetting of thin layers of SiO2 by water," Appl. Phys. Lett. 25, 531-532 (1974) (Year: 1974).*
(Continued)

*Primary Examiner* — Jill A Warden
*Assistant Examiner* — Michael Stanley Gzybowski
(74) *Attorney, Agent, or Firm* — McDonnell Boehnen Hulbert & Berghoff LLP (57) ABSTRACT

A method for fabricating a microfluidic device includes providing an assembly that includes a first silicon substrate having a hydrophilic silicon oxide top surface that includes a microfluidic channel and a second silicon substrate having a hydrophilic silicon oxide bottom surface directly bonded on the top surface of the first silicon substrate, the second silicon substrate including fluidic access holes giving fluidic access to the microfluidic channel. The method also includes exposing the assembly to oxidative species including one or more oxygen atoms and to heat so as to form silicon oxide at a surface of the access holes and of the microfluidic channel.

17 Claims, 4 Drawing Sheets

(52) U.S. Cl.
CPC .. *B81C 1/00849* (2013.01); *B81C 2201/0132* (2013.01); *B81C 2201/0159* (2013.01); *B81C 2201/0169* (2013.01); *B81C 2201/0183* (2013.01); *B81C 2201/0198* (2013.01)

(56) References Cited

U.S. PATENT DOCUMENTS

| | | | | |
|---|---|---|---|---|
| 5,843,833 | A | * 12/1998 | Ohtani | H01L 21/02532 |
| | | | | 257/E21.133 |
| 2010/0277722 | A1 | 11/2010 | Kraiczek et al. | |
| 2011/0008959 | A1 | * 1/2011 | Morgan | H01L 21/30655 |
| | | | | 257/734 |
| 2013/0240483 | A1 | 9/2013 | Ferrari et al. | |
| 2014/0054730 | A1 | 2/2014 | Graham et al. | |
| 2014/0110708 | A1 | * 4/2014 | Koezuka | H01L 29/66969 |
| | | | | 257/43 |
| 2014/0374695 | A1 | * 12/2014 | Astier | B01L 3/502707 |
| | | | | 438/49 |
| 2017/0326548 | A1 | 11/2017 | Tsai et al. | |
| 2018/0331228 | A1 | * 11/2018 | Oikawa | H01L 29/45 |

OTHER PUBLICATIONS

Extended European Search Report and Written Opinion, EP Application No. 20165314.4, mailed Jul. 27, 2020, 4 pages.

Mery, E., F. Ricoul, N. Sarrut, O. Constantin, G. Delapierre, J. Garin, and F. Vinet. "A silicon microfluidic chip integrating an ordered micropillar array separation column and a nano-electrospray emitter for LC/MS analysis of peptides." Sensors and Actuators B: Chemical 134, No. 2 (2008): 438-446.

* cited by examiner

METHOD FOR FABRICATING A MICROFLUIDIC DEVICE

CROSS-REFERENCE TO RELATED APPLICATIONS

The present application is a non-provisional patent application claiming priority to European Patent Application No. 20165314.4, filed on Mar. 24, 2020, the contents of which are hereby incorporated by reference.

FIELD OF THE DISCLOSURE

The present disclosure relates to the field of microfluidic devices and more in particular to the fabrication of such devices by direct bonding of silicon substrates.

BACKGROUND

In recent years, the attention towards reliable and low-cost laboratory-on-chip devices has grown exponentially. The capability to perform on a single chip the whole set of analysis typically retrieved using many different tools represents a very attractive scenario both for point of care applications and conventional laboratories.

A microfluidic device is a device for the manipulation of fluids geometrically constrained in passages measuring less than a millimeter. At such small dimensions, capillarity plays a significant role in mass transport. Microfluidic devices are nowadays a key component of glucose sensors, drug delivery systems as well as cell analysis modules. These devices are typically realized by creating a set of microfluidic structures on inexpensive substrates such as plastic. The fluid is then driven into the system by a pump or capillary forces and, after a series of defined operations, analyzed in an imaging chamber. To achieve compact and cheap systems for the point of care market, there is an increased demand to reduce the fluid volumes manipulated by the device. Such requirements are not trivial to achieve using plastic manufacturing technologies due to intrinsic material properties and tools limitations. Recent results on silicon indicate a much better reproducibility. Silicon also brings the potential advantage of higher precision and manufacturability associated with the reuse of conventional CMOS production lines.

One example of a silicon-based microfluidic device is disclosed in E. Mery et al. (sensors and actuators B 134 (2008) 438-446). In this article, a device integrating a reversed-phase separation column and a nano-electrospray emitter is disclosed. The fabrication process involved the formation of a microfluidic support on one hand and of a cap comprising fluidic access holes on another hand, followed by the molecular bonding of the cap on the microfluidic support. The microfluidic support was itself formed of two silicon substrates, (a bottom substrate and a top substrate, bonded by molecular bonding, followed by the patterning in the top substrate of a microfluidic network and of micropillars by deep reactive ion etching (DRIE), followed by exposition to a thick thermal oxidation to adjust the gap between the micropillars to the desired width. The cap was formed by etching access holes by DRIE in a doped silicon wafer. Once the microfluidic support and the cap were formed, they were molecularly bonded to each other at 1100° C.

This type of bonding is energy-intensive and achieves bonded structures where unintended small gaps at the interface between both substrates tend to be present. When these gaps are connected to the microfluidic channels, they hinder the fluid flow in therein. There is therefore still a need in the art for methods addressing one or more of the above drawbacks.

SUMMARY

It is a potential benefit of the present disclosure to provide methods for fabricating a microfluidic device.

The present disclosure relates to a method for fabricating a microfluidic device, comprising:
a. Providing an assembly comprising:
  i. a first silicon substrate having a hydrophilic silicon oxide top surface comprising a microfluidic channel,
  ii. a second silicon substrate, having a hydrophilic silicon oxide bottom surface directly bonded on the top surface of the first silicon substrate, and comprising fluidic access holes giving fluidic access to the microfluidic channel, and
b. Exposing the assembly to oxidative species comprising one or more oxygen atoms and to heat so as to form silicon oxide at a surface of the access holes and of the microfluidic channel.

It is a potential advantage of embodiments of the present disclosure that they are scalable.

It is a potential advantage of embodiments of the present disclosure that they can make use of conventional CMOS lines.

It is a potential advantage of embodiments of the present disclosure that they are inexpensive.

It is a potential advantage of embodiments of the present disclosure that they are reliable.

It is a potential advantage of embodiments of the present disclosure that they correct defects in the device by filling spaces that could remain between the first and the second substrates after bonding, by filling defective edges of the microchannels, thereby making them sharper, and/or by filling defective cavities on the sidewalls of the microchannels, thereby making them flatter. As a result, the transport of aqueous media, especially via capillary forces, is typically excellent. If step b is not performed, aqueous media tend to be trapped or delayed in defects, which makes the manipulation of the fluid less accurate. Also, sharper corners in microfluidic channels enable them to function as capillary valves in some embodiments.

It is an age of embodiments of the present disclosure that they enable the formation of complex three-dimensional fluidic circuitry.

It is a potential advantage of embodiments of the present disclosure that it is compatible with the formation of access holes of different geometries and sizes, thereby enabling good connection to external devices such as reservoirs and imaging systems.

It is a potential advantage of embodiments of the present disclosure that they lead to devices with reproducible specifications. The accuracy obtained can be down to 2 μm or even 1 μm, or even lower.

It is a potential advantage of embodiments of the present disclosure that they enable the formation of devices that perform well in the manipulation of fluids both by capillary forces and by hydraulic forces (e.g. involving the use of a pump).

It is a potential advantage of embodiments of the present disclosure that they enable the formation of devices that perform well in the manipulation of small volumes of fluids.

It is a potential advantage of embodiments of the present disclosure that they enable the formation of devices that permit the manipulation of fluids in a tight way, avoiding evaporation.

The obtained devices can be connected to pumps, external reservoirs, and/or imaging tools via the access holes.

Particular aspects of the disclosure are set out in the accompanying independent and dependent claims. Features from the dependent claims may be combined with features of the independent claims and with features of other dependent claims as appropriate and not merely as explicitly set out in the claims.

Although there has been constant improvement, change, and evolution of devices in this field, the present concepts are believed to represent substantial new and novel improvements, including departures from prior practices, resulting in the provision of more efficient, stable, and reliable devices of this nature.

The above and other characteristics, features and potential advantages of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

BRIEF DESCRIPTION OF THE FIGURES

The above, as well as additional, features will be better understood through the following illustrative and non-limiting detailed description of example embodiments, with reference to the appended drawings.

In the different figures, the same reference signs refer to the same or analogous elements.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosure.

In the description provided herein, numerous specific details are set forth. However, it is understood that embodiments of the disclosure may be practiced without these specific details. In other instances, well-known methods, structures, and techniques have not been shown in detail in order not to obscure an understanding of this description.

The disclosure will now be described by a detailed description of several embodiments of the disclosure. It is clear that other embodiments of the disclosure can be configured according to the knowledge of persons skilled in the art without departing from the technical teaching of the disclosure, the disclosure being limited only by the terms of the appended claims.

In a first aspect, the present disclosure relates to a method for fabricating a microfluidic device.

The first step of the method of the first aspect comprises providing an assembly comprising:
i. a first silicon substrate having a hydrophilic silicon oxide top surface comprising a microfluidic channel,
ii. a second silicon substrate, having a hydrophilic silicon oxide bottom surface directly bonded on the top surface of the first silicon substrate, and comprising fluidic access holes giving fluidic access to the microfluidic channel.

The first silicon substrate is typically a silicon wafer having a hydrophilic silicon oxide top surface. This hydrophilic silicon oxide surface can be a native oxide, i.e. a silicon oxide naturally formed at the surface of the substrate due to its interaction with air, or it can be an engineered silicon oxide surface. The thickness of this silicon oxide is generally at least 20 nm, or at least 25 nm. The thickness of the silicon oxide is typically 200 nm or less. The duration of the oxidation process is typically adapted to form a silicon oxide coating on the exposed surfaces having such a thickness.

The hydrophilic silicon oxide top surface comprises at least a microfluidic channel. The microfluidic channel is typically present at one of the hydrophilic surfaces of the first silicon substrate. This surface is referred to as its top surface. Typically, a microfluidic channel is a cavity in the first silicon substrate, opening to its surface, enabling fluid transport, and having its smallest lateral dimension (i.e. its width) measuring less than 1 mm. The first silicon substrate may comprise a plurality of microfluidic channels. When more than one microfluidic channels are present, they are typically fluidly interconnected.

In embodiments, the width of the microfluidic channel may be from 100 nm to 999 µm.

In embodiments, the longest of both lateral dimensions (i.e. the length) of the microfluidic channel may be 100 nm or more. There are no practical higher limits to the length of the microfluidic channel. The microfluidic channel may be straight along its length or may comprise one or more bends along its length. The microfluidic channel is typically straight along its length.

In embodiments, when the width of the microfluidic channel varies along its length, the smallest width measured along the length is considered to be the width of the microfluidic channel.

In embodiments, the vertical dimension of the microfluidic channel (i.e. its height) may be from 1 nm to 1 mm. In some embodiments, a vertical cross-section taken perpendicularly to the microfluidic channel length may comprise at least one step defining at least two areas differing in their height. The highest of these areas is the height of the microfluidic channel.

In embodiments, when the width of the microfluidic channel varies along its height, the largest width measured along the height is considered to be the width of the microfluidic channel.

When the width of the microfluidic channel varies along both its length and its height, the smallest width measured along its length is considered to be the width of the microfluidic channel.

The exposed surface of the microfluidic channel, which is for contacting the fluid, typically comprises silicon dioxide. This is can be advantageous as it can favor the transport of aqueous media.

The second silicon substrate is typically a silicon wafer having a hydrophilic silicon oxide bottom surface. This hydrophilic silicon oxide surface can be a native oxide, i.e. a silicon oxide naturally formed at the surface of the substrate due to its interaction with air, or it can be an engineered silicon oxide surface. The thickness of this silicon oxide is generally at least 20 nm, or at least 25 nm. The thickness of the silicon oxide is typically 200 nm or less. The duration of the oxidation is generally adapted to form a silicon oxide coating on the exposed surfaces having such a thickness.

In the assembly, the bottom surface of the second silicon substrate is directly bonded to the top surface of the first silicon substrate. It is bounded to the top surface of the first silicon substrate, i.e. to a side and typically the side of the first silicon substrate comprising the microfluidic channel. The second silicon substrate, by being bound to the first silicon substrate, partially closes the microchannel, leaving only openings at the extremities defining the length of the microchannel. Hence, while the first silicon substrate comprises a microfluidic channel with an open top, the assembly comprises a microfluidic channel with a closed top.

By "directly bonded" it is generally meant that no intermediate layer is present between the hydrophilic silicon oxide top surface of the first silicon substrate and the hydrophilic silicon oxide bottom surface of the second silicon substrate. An alternative term to "directly bonded" is "fusion bonded." Both terms are generally intended as synonyms.

The second silicon substrate comprises fluidic access holes giving fluidic access to the microfluidic channel. The fluidic access holes comprise typically an inlet for transferring a sample from the outside of the device to inside of the device, and an outlet for transferring a sample manipulated by the device from inside of the device to outside of the device.

The fluidic access holes connect the outside of the device with the microfluidic channel comprised in the assembly.

In embodiments, the fluidic access holes may have their smallest lateral extent (i.e. their width) measuring less than 1 mm. In some examples, the width measures from 100 nm to 999 µm.

In embodiments, the fluidic access holes may have their largest lateral extent (i.e. their depth) measuring less than 1 mm. Generally, the depth measures from 100 nm to 999 µm. Typically, the depth ranges from 1 to 2 times the width, more generally, the depth equals the width.

In embodiments, the vertical extent of the fluidic access holes (i.e. their height) may be from 1 µm to 925 µm, from 10 µm to 500 µm, from 50 µm to 300 µm, or from 100 µm to 200 µm. The vertical extent of the fluidic access holes is typically equal to the thickness of the second silicon substrate.

In embodiments, the vertical extent of the fluidic access holes may be equal to from 1 to 50 times the width thereof, from 5 to 40 times the width thereof, or from 10 to 30 times the width thereof.

Typically, the exposure is performed in an oxidation furnace.

In embodiments, step a may comprise:
a1. Providing the first silicon substrate comprising a microfluidic channel,
a2. Providing a second silicon substrate,
a3. Directly bonding the second silicon substrate on the first silicon substrate, and then
a4. Opening the fluidic access holes in the second silicon substrate in such a way that they give fluidic access to the microfluidic channel.

In embodiments, step a1 may comprise:
a11. Providing a first silicon substrate, then
a12. Etching a microfluidic channel in the first silicon substrate, then
a13. Exposing the microfluidic channel to an oxygen-based plasma, then
a14. Exposing the microfluidic channel to a wet cleaning solution, and then
a15. Exposing the microfluidic channel to oxidative species comprising one or more oxygen atoms and to heat so as to convert a surface thereof into silicon oxide.

In embodiments, step a12 may comprise:
a121. Providing a hard mask over the first silicon substrate, the hard mask presenting a feature pattern corresponding to the microfluidic channel to be etched in the first silicon substrate, and then
a122. Etching the first silicon substrate through the hard mask, thereby forming the microfluidic channel.

Any hard mask is suitable.

In embodiments, step a121 may comprise
providing a continuous hard mask layer (e.g. a silicon oxide layer) on the first silicon substrate,
treating the top surface of the hard mask layer to make it hydrophilic,
providing a photoresist layer on the hard mask layer,
exposing and developing the photoresist layer to form a feature pattern corresponding to a microfluidic channel to be etched in the first silicon substrate,
dry etching the hard mask layer through the patterned photoresist layer, thereby transferring the pattern to the hard mask layer, and
removing the photoresist.

In embodiments, step a122 may be performed by:
a1221. Anisotropic plasma etching in an etching step a surface of the first silicon substrate by contact with a reactive etching gas to remove material from the surface of the first silicon substrate and provide exposed surfaces,
a1222. Polymerizing in a polymerizing step at least one polymer former contained in the plasma onto the surface of the first silicon substrate during which the surfaces that were exposed in a preceding etching step are covered by a polymer layer thereby forming a temporary etching stop, and
a1223. Alternatingly repeating the etching step and the polymerizing step. This embodiment is potentially advantageous as it enables high uniformity across the substrate. This embodiment has the potential advantage to enable the formation of high aspect ratio features with precise control on depth and dimensions.

An example of suitable etching gas is a mixture of argon and sulfur hexafluoride $SF_6$.

An example of a suitable polymer former is trifluoromethane $CHF_3$.

In embodiments, step a12 may be performed by a two-level depth process. Channels with two levels can for instance function as timing channels. In embodiments, the two-level depth process may comprise the steps of:

Providing a first hard mask (e.g. a silicon oxide hard mask) over (e.g. on) the first silicon substrate,
Providing a second hard mask (e.g. a $Si_3N_4$ hard mask) over the first silicon substrate, wherein the first and the second hard mask, together, present a feature pattern corresponding to a microfluidic channel to be etched in the first silicon substrate, wherein a portion of the first silicon substrate covered by the second hard mask but not by the first hard mask corresponds to a portion of the microfluidic channel to be etched in the first silicon substrate at a first depth, wherein a portion of the first silicon substrate neither covered by the first hard mask nor by the second hard mask corresponds to a portion of the microfluidic channel to be etched in the first silicon substrate at a second depth, deeper than the first depth,
Etching the first silicon substrate selectively with respect to the second hard mask,
Removing the second hard mask selectively with respect to the first hard mask,
Etching the first silicon substrate selectively with respect to the first hard mask, and
Removing the first hard mask.

Step iii) and v) may for instance each be performed by following steps a1221 to a1223.

Step a13 is potentially advantageous because it enables a good cleaning of the microchannel. In particular, when the etching comprises polymerizing in a polymerizing step at least one polymer former such as trifluoromethane, the resulting polymer can be removed in step a13.

In embodiments, step a13 may comprise exposing the microfluidic channel to an oxygen-based plasma. Typically, the oxygen-based plasma exposure is performed on the microfluidic channel while the first silicon substrate is kept at a temperature of at least 200° C. This is potentially advantageous as it can improve the removal of the etch residues. In embodiments, the oxygen-based plasma may, in addition to oxygen, comprise $CF_4$. This is can be advantageous as it can improve the removal of the etch residues. In embodiments, the oxygen-based plasma further comprises $CF_4$ and the plasma exposure is performed on the microfluidic channel while the first silicon substrate is kept at a temperature of at least 200° C.

Step a14 comprises exposing the microfluidic channel to a wet cleaning solution. Step a14 is potentially advantageous because it can allow removing remaining etch residues. The exposure to the wet cleaning solution can for instance last for from 30 min to 90 min or from 45 min to 75 min. Examples of suitable wet cleaning solutions are a piranha solution (a mixture of sulfuric acid, hydrogen peroxide, and water) and commercial solutions such as EKC4000™ from Dupont®.

In embodiments, step a15 may comprise exposing the microfluidic channel to oxidative species comprising one or more oxygen atoms and to heat so as to convert a surface thereof into silicon oxide.

In embodiments, the oxidative species comprising one or more oxygen atoms may be selected from molecular oxygen ($O_2$), water ($H_2O$), and mixtures thereof.

In embodiments, the heat may be a temperature of from 500° C. to 1200° C.

In embodiments, exposing the microfluidic channel to oxidative species comprising one or more oxygen atoms and to heat may comprise performing an oxidation selected from
a dry oxidation where the microfluidic channel is exposed to an atmosphere comprising at least 90% oxygen, at least 95% oxygen, at least 99% oxygen, or 100% oxygen, wherein the heat is from 800° C. to 1200° C., and a wet oxidation where the microfluidic channel is exposed to an atmosphere comprising at least 80% water, at least 85% water, at least 90% water, or 92% water, wherein the heat is from 800° C. to 1200° C., or from 900° C. to 1000° C.

The atmospheric pressure used in the furnace where the oxidation occurs is typically 1 atm but other pressures can be used.

The duration of step b is usually adapted to form a silicon oxide coating on the exposed surfaces having a thickness of from 100 nm to 2 µm, or from 500 nm to 1.5 µm.

The duration of step b is typically from 1 h to 48 h, or from 5 h to 24 h.

In embodiments, the microfluidic channel of the first silicon substrate may be a first microfluidic channel of a first height for carrying fluid laterally, wherein the second silicon substrate comprises a second microfluidic channel of a second height for carrying fluid laterally, wherein the second silicon substrate is directly bonded on the first silicon substrate so as to superimpose the second microfluidic channel on the first microfluidic channel to form a third microfluidic channel having a third height, equal to the addition of the first height and the second height, for carrying fluid laterally. The presence of alignment fiducials is favorable to these embodiments.

Any feature of the second microfluidic channel may be independently as indicated for the first microfluidic channel.

Any feature of the third microfluidic channel may be independently as indicated for the first microfluidic channel except for its height which may be from 2 nm to 2 mm instead of from 1 nm to 1 mm. Also, in embodiments, the aspect ratio (third height on width) of the third microfluidic channel may be from 2 to 8, for instance from 5 to 8, or even from 6 to 8.

In embodiments, step a2 may comprise:
a21. Providing a second silicon substrate, then
a22. Etching a microfluidic channel in the silicon substrate, then
a23. Exposing the microfluidic channel to an oxygen-based plasma, then
a24. Exposing the microfluidic channel to a wet cleaning, and then
a25. Exposing the microfluidic channel to oxidative species comprising one or more oxygen atoms and to heat so as to convert a surface thereof into silicon oxide. This embodiment can be combined with any previous embodiment but is particularly useful when a third microfluidic channel having a third height is to be formed.

Any feature of step a2 may be as correspondingly described in step a1.

In embodiments, the first silicon substrate and the second silicon substrate may both comprise alignment fiducials, wherein the alignment fiducials are aligned before bonding. The presence of alignment fiducials favors the formation of very high aspect ratio microfluidic channels and/or three-dimensional fluidic circuitry in the device. For instance, in embodiments, aspect ratio (third) height/width may be up to 8.

The alignment fiducials may be printed at the same time as the microfluidic channels are formed in each substrate.

In embodiments, step a3 may include a step of pressing the second substrate on the first substrate with a press. Generally, a force applied by the press on both substrates is at least 20 kN, at least 40 kN, at least 50 kN, or 60 kN or more. Typically, the force applied is at most 200 kN. The use of a force of at least 20 kN in step a3 can be advantageous because it can reduce the size of bonding voids that can be present at the bonding interface between both substrates. This, in turn, improves the mechanical stability of the device.

In embodiments, step a3 may comprise placing the second silicon substrate on the first silicon substrate, then exposing both substrates to a temperature of from 110° C. to 250° C., or from 150° C. to 250° C. Such very low bonding temperatures are made possible by the use of pressure during the bonding process. The use of heat consolidates the bonding by accelerating the evaporation of the water at the interface between both substrates. It also further stabilizes mechanically the assembly.

In embodiments, step a3 may comprise the steps of fixing one or both substrates on a chuck (typically fixing the bottom surface of the first silicon substrate thereon), bending the second silicon substrate so that the concavity thereof comprises the bottom surface, contacting the concave bottom surface of the bent second silicon substrate with the top surface of the first silicon substrate, allowing the second silicon substrate to regain a flat profile, expose the assembly to pressure and heat as mentioned in any embodiments. Optionally, before exposing the assembly to pressure and heat, the alignment of both substrates may first be checked (e.g. with a camera), then both substrates may be separated within 1 day of the bonding, then the alignment of both substrates may be corrected, and both substrates may be bonded again by starting with the bending step.

In embodiments, step a4 may comprise the steps of:
a41. Thinning the second silicon substrate to a thickness of from 1 µm to 200 µm, or from 60 to 100 µm, and then
a42. Opening the fluidic access holes in the thinned second silicon substrate in such a way that they give fluidic access to the microfluidic channel.

It has been surprisingly observed by the inventors that by thinning the second silicon substrate, the bonding between both substrates is much improved. It is believed that it is due to stress release within the second substrate during the thinning process.

In embodiments, step a41 may be performed by decreasing the grinding speed between the beginning of the grinding and the end of the grinding. This can be advantageous because a faster grinding speed at the beginning can permit a faster thinning, while a slower grinding speed at the end can achieve a smoother top surface for the second thinned second substrate. This is can be very advantageous as it can allow good control of the subsequent lithographic steps used for forming the access holes.

In embodiments, the fluidic access holes in step a4 may be opened by i-line lithography. In embodiments, the access holes are first partially etched by i-line lithography before being opened by etching the silicon by traditional etching processes and stopping on the silicon oxide acting as an etch-stop. This process has the potential advantage of being highly controllable, even for small etch opening area, provided the area of the opening is at least 1% of the area of the silicon substrate. It has the additional potential advantage to prevent any damage to the bottom substrate during access hole opening.

After step a of providing the assembly, the method comprises step b of exposing the assembly to oxidative species comprising one or more oxygen atoms and to heat so as to form silicon oxide at a surface of the access holes and of the microfluidic channel. We now refer to FIGS. 4 and 5 which show the portion of FIG. 3 within the black square after that step b has been performed. Step b can be advantageous because not only can it make the walls of the fluidic access holes and the microchannel uniformly hydrophilic, but it can also correct defects in the device by filling spaces (9) that could remain between the first and the second substrates after bonding, filling defective edges (7) of the microchannels, thereby making them sharper, and filling defective cavities (8) on the sidewalls of the microchannels, thereby making them flatter. Step b much improves the transport of aqueous media, especially via capillary forces. If step b is not performed, aqueous media tend to be trapped or delayed in defects, which makes the manipulation of the fluid less accurate.

In embodiments, the oxidative species comprising one or more oxygen atoms may be selected from molecular oxygen ($O_2$), water ($H_2O$), and mixtures thereof.

In embodiments, the heat may be a temperature of from 500° C. to 1200° C.

In embodiments, exposing the assembly to oxidative species comprising one or more oxygen atoms and to heat may comprise performing an oxidation selected from
  a dry oxidation where the assembly is exposed to an atmosphere comprising at least 90% oxygen, at least 95% oxygen, at least 99% oxygen, or 100% oxygen, wherein the heat is from 800° C. to 1200° C., and
  a wet oxidation where the assembly is exposed to an atmosphere comprising at least 80% water, at least 85% water, at least 90% water, for instance 92% water, wherein the heat is from 800° C. to 1200° C., or from 900° C. to 1000° C.

The atmospheric pressure used in the furnace where the oxidation occurs is typically 1 atm but other pressures can be used.

The duration of step b can be adapted to form a silicon oxide coating on the exposed surfaces having a thickness of from 100 nm to 2 µm, or from 500 nm to 1.5 µm.

The duration of step b is typically from 1 h to 48 h, or from 5 h to 24 h.

We now refer to FIGS. 1 to 5 where a particular embodiment of the present disclosure is shown.

Figure 1:
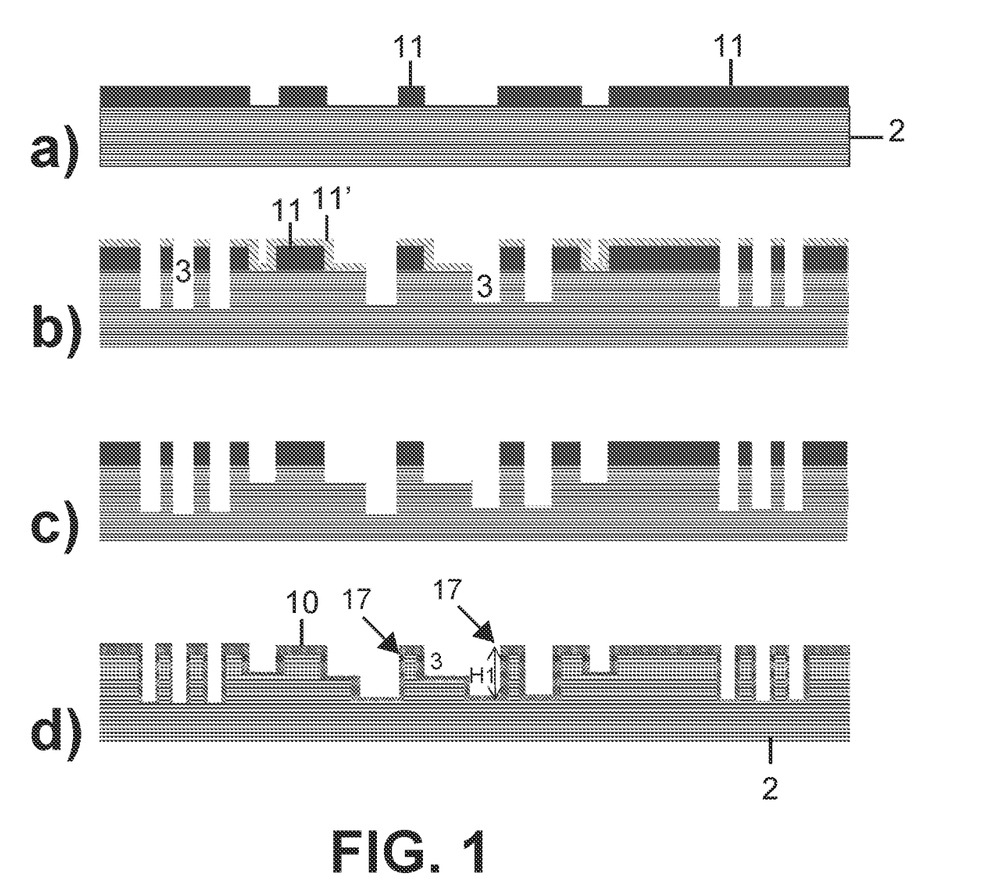
FIG. 1 shows vertical cross-sections of intermediates, according to an example.

In panel a) of FIG. 1, a first patterned hard mask (11) (e.g. silicon oxide) is provided over the first silicon substrate (2). This can, for instance, be performed by providing a continuous hard mask (11) layer (e.g. a silicon oxide layer) on the first silicon substrate (2), cleaning, then treating the top surface of the hard mask (11) layer to make it hydrophilic, providing a photoresist layer on the hard mask (11) layer, exposing and developing the photoresist layer to form the pattern, dry etching the hard mask (11) layer through the patterned photoresist layer, thereby transferring the pattern to the hard mask (11) layer, and removing the photoresist.

In panel b) of FIG. 1, a second hard mask (11') (e.g. a $Si_3N_4$ hard mask (11')) is provided over the first silicon substrate (2). The first and the second hard mask (11'), together, present a feature pattern corresponding to a microfluidic channel to be etched in the first silicon substrate (2), wherein a portion of the first silicon substrate (2) covered by the second hard mask (11') but not by the first hard mask (11) corresponds to a portion of the microfluidic channel to be etched in the first silicon substrate (2) at a first depth, wherein a portion of the first silicon substrate (2) neither covered by the first hard mask (11) nor by the second hard mask (11') corresponds to a portion of the microfluidic channel (3) to be etched in the first silicon substrate (2) at a second depth, deeper than the first depth. After the second hard mask (11') is provided, a first etch of the first silicon substrate (2) is performed selectively with respect to the second hard mask (11').

In panel c) of FIG. 1, the second hard mask (11') is removed selectively with respect to the first hard mask (11) and the first silicon substrate (2) is etched selectively with respect to the first hard mask (11).

In panel d) of FIG. 1, the first hard mask (11) is removed, the first microfluidic channel (3) is exposed to an oxygen-based plasma, then to a wet cleaning solution, and finally to oxidative species comprising one or more oxygen atoms and to heat in an oxidation furnace to convert a surface thereof into silicon oxide (10). The thickness of this silicon oxide (10) is typically at least 20 nm, or at least 25 nm, and generally 200 nm or less. Also shown in panel (d) of FIG. 1 are alignment fiducials (17) of the first silicon substrate (2).

Figure 2:
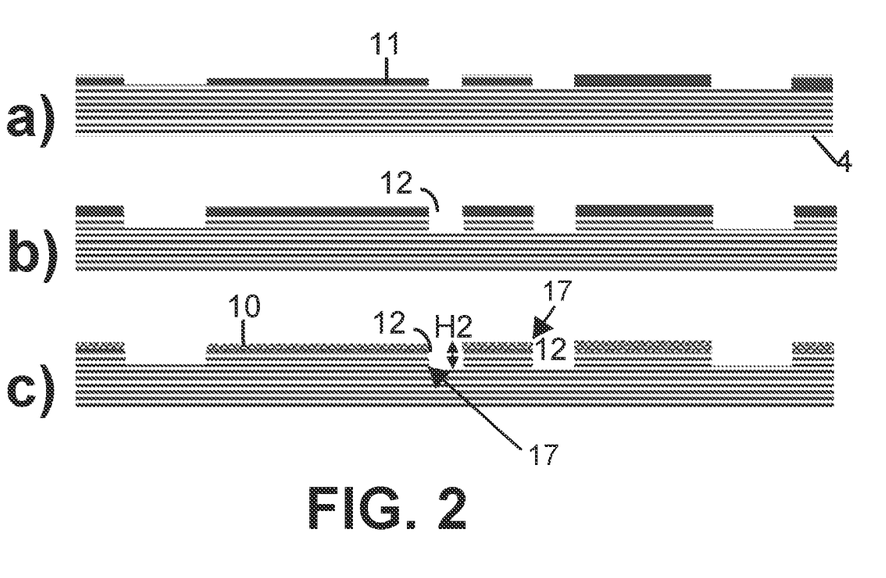
FIG. 2 shows vertical cross-sections of intermediates, according to an example.

In panel a) of FIG. 2, a second silicon substrate (4) is provided with a hard mask (11) pattern thereon. The hard mask (11) pattern can be provided by first providing a continuous hard mask (11) layer (e.g. a silicon oxide layer) on the second silicon substrate (4), treating the top surface of the hard mask (11) to make it hydrophilic, providing a photoresist layer on the hard mask (11) layer, exposing and developing the photoresist layer to form a feature pattern corresponding to a microfluidic channel (12) to be etched in the second silicon substrate (4), dry etching the hard mask (11) layer through the patterned photoresist layer, thereby transferring the pattern to the hard mask (11) layer, then removing the photoresist.

In panel b) of FIG. 2, the second silicon substrate (4) is etched through the hard mask (11), thereby forming the microfluidic channel (12).

In panel c) of FIG. 2, the hard mask (11) is removed and the bottom surface of the second substrate, i.e. the surface in which a second microchannel is etched, is first exposed to an oxygen-based plasma, then exposed to a wet cleaning solution, and then exposed to oxidative species comprising one or more oxygen atoms and to heat so as to convert a surface thereof into silicon oxide (10). The thickness of this silicon oxide (10) is typically at least 20 nm, or at least 25 nm. The silicon dioxide thickness is generally 200 nm or less. Also shown in panel (c) of FIG. 2 are alignment fiducials (17) of the second silicon substrate (4).

Figure 3:
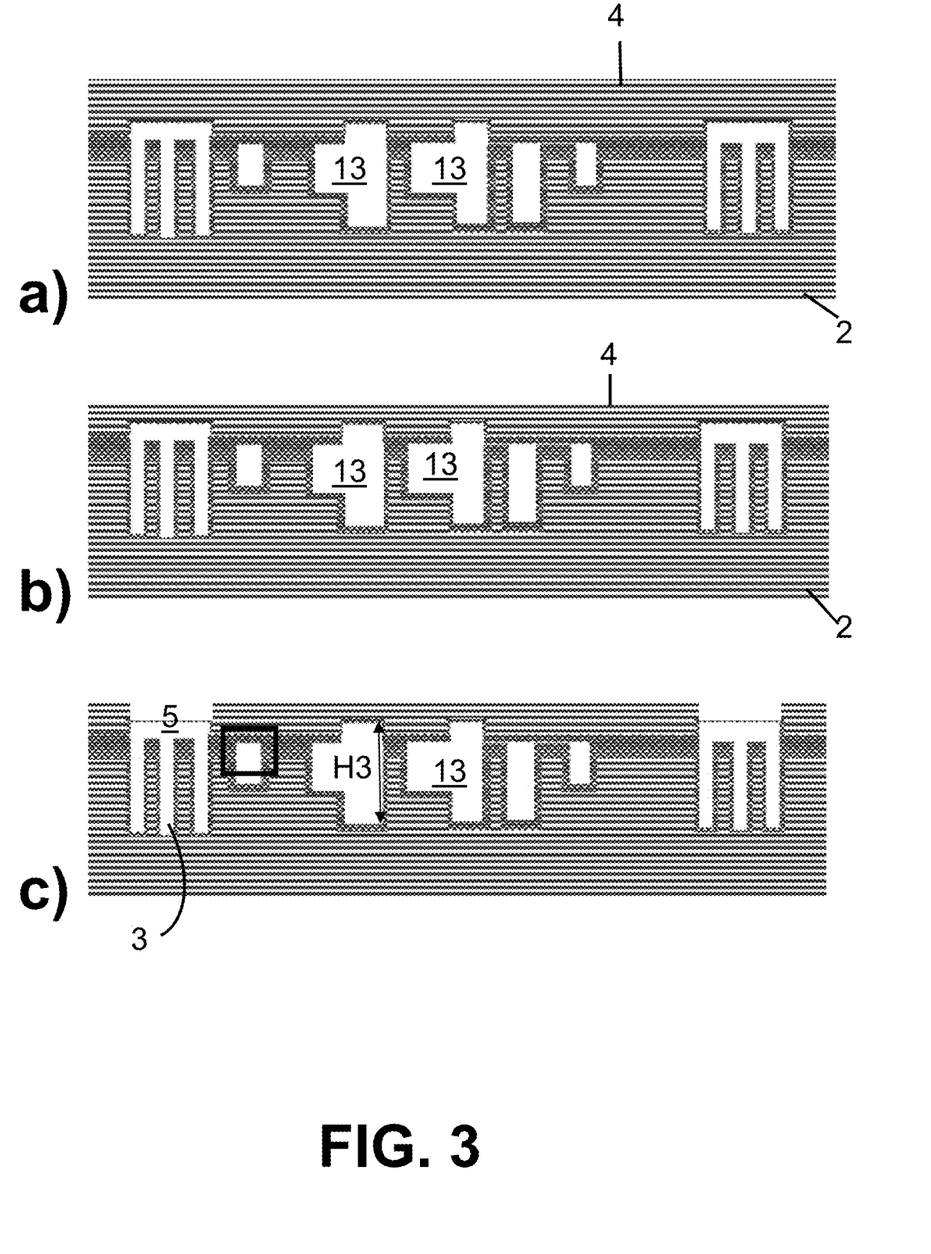
FIG. 3 shows vertical cross-sections of intermediates, according to an example.

In panel a) of FIG. 3, the top of the first silicon substrate (2) is bonded with the bottom of the second silicon substrate (4) by fusion bonding, so as to superimpose the second microfluidic channel (12) on the first microfluidic channel (3) to form a third microfluidic channel (13) having a third height (H3), equal to the addition of the first height (H1) and the second height (H2), for carrying fluid laterally.

In panel b) of FIG. 3, the top of the second substrate is thinned to a thickness of 1 µm to 200 µm.

In panel c) of FIG. 3, the fluidic access holes (5) are opened in the thinned second silicon substrate (4) in such a way that they give fluidic access to the microfluidic channel (3).

Figure 4:
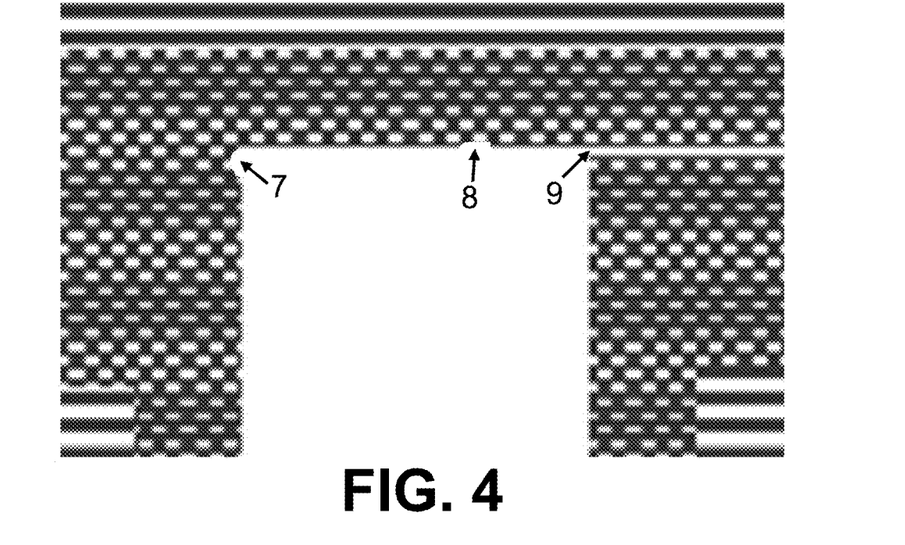
FIG. 4 is a vertical cross-section of a microfluidic device, according to an example.

FIG. 4 shows the portion of FIG. 3 within the black square before that step b has been performed.

Figure 5:
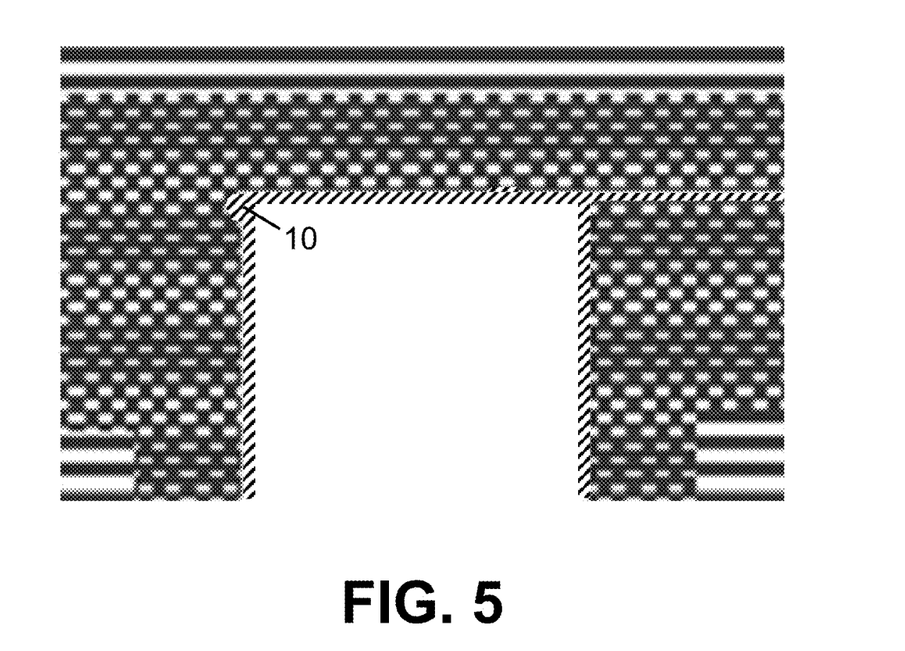
FIG. 5 is a vertical cross-section of a microfluidic device, according to an example.

FIG. 5 shows the same portion after that step b has been performed. Defects in the device are corrected by filling spaces (9) that could remain between the first and the second substrates after bonding, filling defective edges (7) of the microchannels, thereby making them sharper, and filling defective cavities (8) on the sidewalls of the microchannels, thereby making them flatter.

Not depicted but also happening during step b is that the walls of the fluidic access holes (5) and the microchannel are made uniformly hydrophilic by step b which provides a silicon oxide (10) coating lining the walls of the microchannel.

The presence of the silicon oxide (10) coating is visible in cross-sectional Scanning Electron Microscopy images (not depicted).

It is to be understood that although embodiments, specific constructions, and configurations, as well as materials, have been discussed herein for devices according to the present disclosure, various changes or modifications in form and detail may be made without departing from the scope of this disclosure. For example, any formulas given above are merely representative of procedures that may be used. Functionality may be added or deleted from the block diagrams and operations may be interchanged among functional blocks. Steps may be added or deleted to methods described within the scope of the present disclosure.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method comprising:
    forming a first hydrophilic silicon oxide surface on a first silicon substrate that includes a microfluidic channel;
    forming a second hydrophilic silicon oxide surface on a second silicon substrate;
    bonding the first hydrophilic silicon oxide surface to the second hydrophilic silicon oxide surface such that the microfluidic channel is partially closed by the second hydrophilic silicon oxide surface; and
    removing a portion of the second silicon substrate, thereby forming a fluidic access hole that passes through the second silicon substrate to provide access to the microfluidic channel.

2. The method of claim 1, wherein the microfluidic channel includes surface levels at multiple depths.

3. The method of claim 1, wherein bonding the first hydrophilic silicon oxide surface to the second hydrophilic silicon oxide surface comprises heating the first silicon substrate and the second silicon substrate to a temperature of 110° C. to 250° C.

4. The method of claim 1, further comprising thinning the second silicon substrate to a thickness of 1 µm to 200 µm prior to forming the fluidic access hole.

5. The method of claim 1, wherein forming the fluidic access hole comprises forming the fluidic access hole via i-line lithography.

6. The method of claim 1, wherein forming the first hydrophilic silicon oxide surface comprises annealing the first hydrophilic silicon oxide surface at a temperature of 500° C. to 1200° C.

7. The method of claim 1, further comprising exposing the microfluidic channel and the fluidic access hole to an oxidative material and to heat ranging from 500° C. to 1200° C.

8. The method of claim 1, further comprising:
    forming and patterning a first mask on the first silicon substrate;
    forming and patterning a second mask on the first mask or the first silicon substrate, thereby forming first regions of the first silicon substrate covered by both the first mask and the second mask, second regions of the first silicon substrate covered by the second mask but not the first mask, and third regions of the first silicon substrate covered by neither the first mask nor the second mask;
    etching the second regions to a first depth into the first silicon substrate; and
    etching the third regions to a second depth into the first silicon substrate that is deeper than the first depth,
    wherein forming the first hydrophilic silicon oxide surface comprises forming the first hydrophilic silicon oxide surface on the first regions, the second regions, and the third regions after etching the second regions and etching the third regions.

9. The method of claim 1, wherein bonding the first hydrophilic silicon oxide surface to the second hydrophilic silicon oxide surface comprises pressing the second silicon substrate against the first silicon substrate while exposing the first hydrophilic silicon oxide surface and the second hydrophilic silicon oxide surface to an oxidative material.

10. The method of claim 1, wherein bonding the first hydrophilic silicon oxide surface to the second hydrophilic silicon oxide surface comprises exposing the first hydrophilic silicon oxide surface and the second hydrophilic silicon oxide surface to an oxidative material.

11. The method of claim 1, wherein forming the second hydrophilic silicon oxide surface comprises:
    exposing the microfluidic channel in the second silicon substrate to an oxygen-based plasma;
    exposing the microfluidic channel in the second silicon substrate to a wet cleaning solution; and
    exposing the microfluidic channel in the second silicon substrate to an oxidative species comprising one or more oxygen atoms and heating the microfluidic channel in the second silicon substrate.

12. The method of claim 11, wherein the first silicon substrate and the second silicon substrate both comprise alignment fiducials, and wherein bonding the first hydrophilic silicon oxide surface to the second hydrophilic silicon oxide surface comprises bonding the first hydrophilic silicon oxide surface to the second hydrophilic silicon oxide surface such that the alignment fiducials are aligned.

13. The method of claim 1, wherein bonding the first hydrophilic silicon oxide surface to the second hydrophilic silicon oxide surface comprises pressing the second silicon substrate against the first silicon substrate.

14. The method of claim 13, wherein pressing the second silicon substrate against the first silicon substrate comprises pressing the second silicon substrate against the first silicon substrate with a force of at least 20 kN.

15. The method of claim 1, further comprising:
    etching the microfluidic channel in the first silicon substrate prior to forming the first hydrophilic silicon oxide surface, wherein forming the first hydrophilic silicon oxide surface comprises:
    exposing the microfluidic channel in the first silicon substrate to an oxygen-based plasma;
    exposing the microfluidic channel in the first silicon substrate to a wet cleaning solution; and
    exposing the microfluidic channel in the first silicon substrate to an oxidative species comprising one or more oxygen atoms and heating the microfluidic channel in the first silicon substrate.

16. The method of claim 15, wherein etching the microfluidic channel in the first silicon substrate comprises:
provi­ding a hard mask over the first silicon substrate, the hard mask presenting a feature pattern corresponding to the microfluidic channel in the first silicon substrate; and
etching the first silicon substrate through the hard mask.

17. The method of claim 16, wherein etching the first silicon substrate comprises:
performing, via a plasma, an anisotropic etch of the first silicon substrate using a reactive etching gas, thereby removing material from the first silicon substrate and providing exposed surfaces; and
polymerizing a polymer former contained in the plasma onto the first silicon substrate.

* * * * *